United States Patent
Schmidt

(10) Patent No.: US 7,399,040 B2
(45) Date of Patent: Jul. 15, 2008

(54) METHOD AND DEVICE FOR CONTROLLING THE BRAKE SYSTEM OF A MOTOR VEHICLE

(75) Inventor: Mario Schmidt, Freiberg (DE)

(73) Assignee: Robert Bosch GmbH, Stuttgart (DE)

( * ) Notice: Subject to any disclaimer, the term of this patent is extended or adjusted under 35 U.S.C. 154(b) by 231 days.

(21) Appl. No.: 10/533,627

(22) PCT Filed: Jun. 20, 2003

(86) PCT No.: PCT/DE03/02059

§ 371 (c)(1),
(2), (4) Date: Mar. 31, 2006

(87) PCT Pub. No.: WO2004/039646

PCT Pub. Date: May 13, 2004

(65) Prior Publication Data

US 2006/0220455 A1  Oct. 5, 2006

(30) Foreign Application Priority Data

Oct. 31, 2002  (DE)  ............................ 102 50 719

(51) Int. Cl.
*B60K 41/20* (2006.01)
(52) U.S. Cl. ........................... 303/191; 303/192
(58) Field of Classification Search ......... 303/190–192
See application file for complete search history.

(56) References Cited

U.S. PATENT DOCUMENTS

| | | | | |
|---|---|---|---|---|
| 4,852,950 A | * | 8/1989 | Murakami | 303/192 |
| 5,916,062 A | * | 6/1999 | Siepker | 477/194 |
| 6,199,964 B1 | * | 3/2001 | Ota et al. | 303/192 |
| 6,260,934 B1 | * | 7/2001 | Lee | 303/192 |
| 6,364,436 B1 | * | 4/2002 | Sawada | 303/191 |
| 6,439,675 B1 | * | 8/2002 | Holl et al. | 303/191 |
| 6,547,344 B2 | * | 4/2003 | Hada et al. | 303/191 |

FOREIGN PATENT DOCUMENTS

| | | |
|---|---|---|
| DE | 199 25 249 | 12/2000 |
| DE | 199 50 034 | 4/2001 |
| EP | 1 327 566 | 7/2003 |
| JP | 59 143747 | 8/1984 |
| WO | 01 58714 | 8/2001 |

* cited by examiner

*Primary Examiner*—Christopher P Schwartz
(74) *Attorney, Agent, or Firm*—Kenyon & Kenyon LLP

(57) ABSTRACT

The present invention relates to a method for controlling the braking system of a motor vehicle, in which, in order to prevent the vehicle from rolling away following a braked standstill, a first braking-force value on at least one wheel is built up independently of the driver and is held for a specified limited holding time. According to the present invention, the angle of gradient of the roadway in the longitudinal direction of the vehicle is ascertained, and the holding time is a function of the angle of gradient ascertained.

9 Claims, 4 Drawing Sheets

METHOD AND DEVICE FOR CONTROLLING THE BRAKE SYSTEM OF A MOTOR VEHICLE

FIELD OF THE INVENTION

The present invention is based on a method and a device for controlling a braking system.

BACKGROUND INFORMATION

German Published Patent Application No. 199 50 034 describes a method and a device for controlling a braking system of a motor vehicle, in which, in at least one operating state, when the brake pedal is actuated, the braking force is retained at at least one wheel of a vehicle independently of the degree of pedal actuation. Various conditions are provided jointly or alternatively for the activation or deactivation of the function.

The features in the preambles of the independent claims are taken from German Published Patent Application No. 199 50 034.

SUMMARY OF THE INVENTION

The present invention relates to a method for controlling the braking system of a motor vehicle,
in which, to prevent the vehicle from rolling away following a braked standstill, a first braking-force value is set independently of the driver at at least one wheel of the vehicle and is held for a specified limited holding time.

These methods are also known under the name of "hillholder" or "HHC" (="Hill Hold Control").

The advantageous essence of the invention is that
the angle of gradient of the roadway in the longitudinal direction of the vehicle is ascertained and
the holding time is a function of the angle of gradient ascertained.

Particularly, in the case of an uphill standing-start operation, the driver is thereby advantageously given more time for the standing-start operation.

One advantageous embodiment of the present invention is characterized in that, in response to a detection of an intention of the driver to drive off (e.g. through the operation of the accelerator pedal, without, however, sufficient engine torque having to be provided yet for the standing-start operation), during the specified holding time
the specified holding time is cut short and
a second braking-force value is maintained independently of the driver as of this point in time during (i.e. for the duration of) a specified extended holding time.

The use of two time intervals (holding time and extended holding time) makes it possible to decouple the steps necessary for the uphill standing-start operation
1. switch from the brake pedal to the accelerator pedal and
2. generation of the necessary engine torque using the accelerator pedal, and advantageously to provide each of these two necessary steps with its own time interval.

One advantageous embodiment of this is characterized in that the extended holding time or the duration of the extended holding time is a function of the angle of gradient ascertained. This makes it possible to extend the time available to the driver for the generation of the engine torque necessary for the standing-start operation, particularly in the case of standing-start operations on roadways with a steep uphill gradient.

One advantageous embodiment is characterized in that the extended holding time or the duration of the extended holding time reaches its maximum value when the angle of gradient exceeds a specified positive limiting value.

The advantage is that this provides the maximum holding time of the braking force for the standing-start operation in the case of steeply inclined roadways.

One advantageous development is characterized in that the driver's intention to drive off is registered through the actuation of the accelerator pedal. This embodiment is possible without additional effort, since the state or the position of the accelerator pedal is a quantity known to the engine control unit.

One advantageous refinement is characterized in that the holding time is a continuous function of the angle of gradient.

One likewise advantageous embodiment is characterized in that the extended holding time is a continuous function of the angle of gradient.

One advantageous specific embodiment is characterized in that under the stipulation that the angle of gradient has a negative sign in the case of a downhill standing-start operation and that the angle of gradient has a positive sign in the case of an uphill standing-start operation, the holding time either remains constant or increases with an increasing angle of gradient.

One likewise advantageous specific embodiment is characterized in that under the stipulation that the angle of gradient has a negative sign in the case of a downhill standing-start operation and that the angle of gradient has a positive sign in the case of an uphill standing-start operation, the extended holding time either remains constant or increases with an increasing angle of gradient. One advantageous specific embodiment is characterized in that the first braking-force value is equal to the second braking-force value. This specific embodiment is especially easy to implement in a control unit.

The present invention also relates to a device for controlling the braking system of a motor vehicle,
containing roll-away prevention means which, to prevent the vehicle from rolling away following a braked standstill, set a first braking-force value independently of the driver at at least one wheel of the vehicle and retain it for a specified limited holding time.

The advantage of this device is that
it contains means for ascertaining the angle of gradient which ascertain the angle of gradient of the roadway in the longitudinal direction of the vehicle and
the roll-away prevention means are designed in such a way that the holding time is a function of the angle of gradient ascertained.

DETAILED DESCRIPTION

Figure 1:
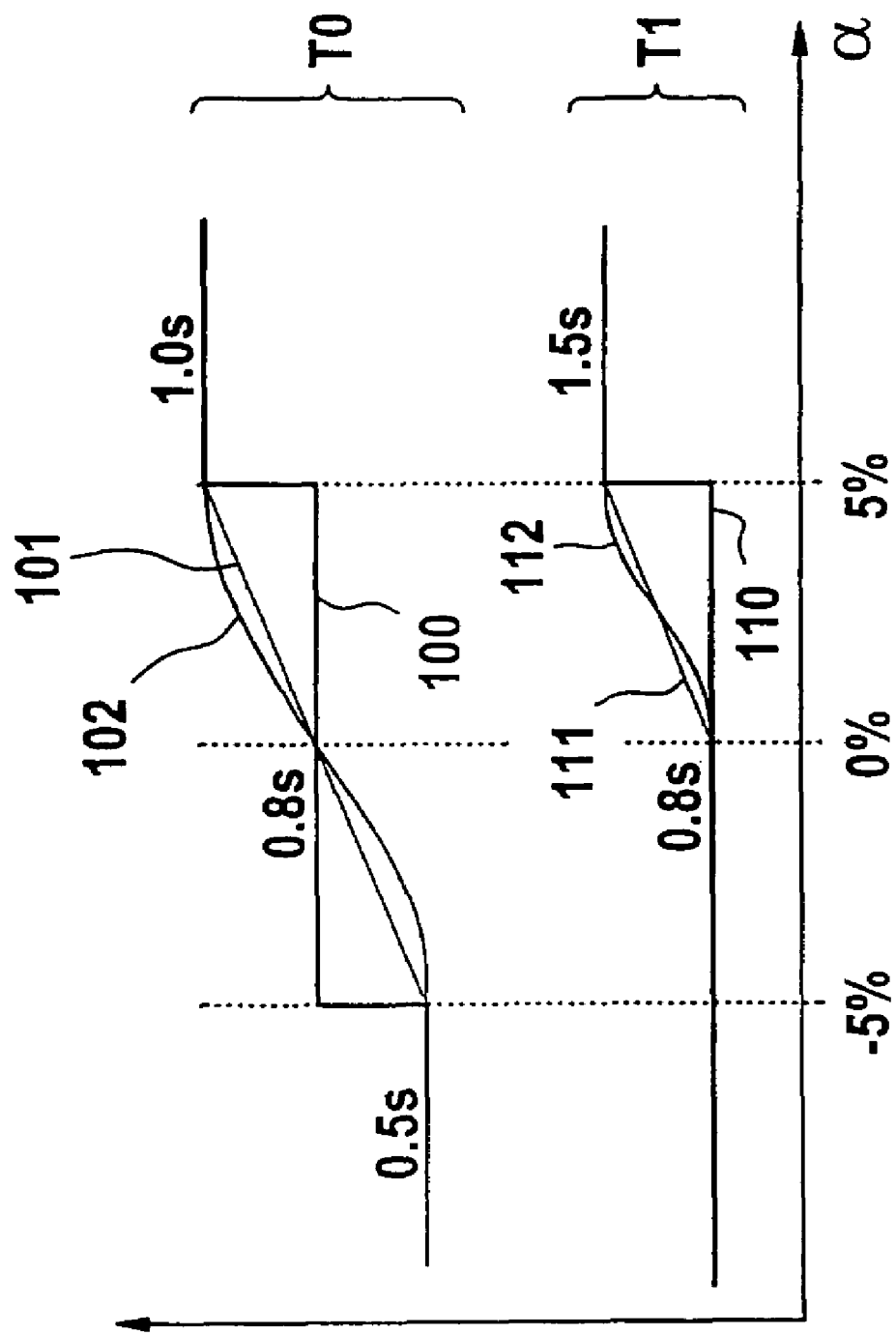
FIG. 1 shows the basic ideas of the present invention in the form of a diagram.

Hill-Hold-Control (also called HHC or "hillholder") is a system that relieves the driver from operating the parking brake (e.g. hand brake) when driving off. By maintaining ("locking in") the braking pressure applied by the driver, HHC prevents the vehicle from rolling back when the brake pedal is released prior to actually driving off. For the duration of a fixed or variable holding time, the braking pressure is locked in or built up by the HHC system.

In one specific embodiment of the system without a sensor for measuring the gradient or means for calculating the gradient, it is impossible to be sure whether the vehicle is facing uphill or downhill. The system, consequently, is activated equally on flat, uphill and downhill surfaces. This has a disadvantageous effect if the driver wants to let the vehicle coast downhill, especially if the driver wants to park downhill. In that case, the HHC may be reactivated every time the vehicle comes to a standstill.

The longitudinal gradient of the roadway may be ascertained from the engine torque, the braking torque and the vehicle deceleration or acceleration. If these variables are known, the roadway gradient may be inferred using Newton's equation of motion (since, in addition to the braking force, a component of the weight force as a function of the angle of gradient also acts counter to the direction of motion). Alternatively, the gradient may also be ascertained using a longitudinal-acceleration sensor.

It is possible to operate an HHC system using two different holding times, that is, holding time T0 and an extended holding time T1. In this context, the holding time is the time span from the release of the brake pedal (discernible, for example, from the status of the brake light switch) to the deactivation of the HHC, provided that the driver does not want to drive off, i.e. the driver does not operate the accelerator pedal. If the driver, however, operates the accelerator pedal within the holding time, he is provided with another time span following the operation of the accelerator pedal in order to be able to generate sufficient engine torque for the standing-start operation. This additional time span, beginning with the operation of the accelerator pedal, is called the extended holding time. The concept of the extended holding time can also be clearly understood by way of the following illustration:

If the driver operates the accelerator pedal during the holding time, the holding time is considered as having elapsed and a new time span takes effect, during which the vehicle is immobilized by a driver-independent brake intervention. This new time span is called the extended holding time.

NUMERICAL EXAMPLE

T0=0.8 seconds, T1=1.5 seconds.

Following the activation of the HHC system (release of the brake pedal), the vehicle is immobilized for a maximum of 0.8 seconds in order to make it easier for the driver to drive off. Let us say that after 0.3 seconds, the driver operates the accelerator pedal. Beginning from this point in time of the operation of the accelerator pedal, the vehicle is now immobilized for 1.5 seconds to make it easier for the driver to drive off.

The basic idea of the invention is to choose the holding time and/or the extended holding time as a function of the respective gradient.

Three measures present themselves for this purpose:
Measure 1: Shorten the holding time for negative gradients
Measure 2 Extend the holding time for positive gradients
Measure 3: Extend the extended holding time for positive gradients In this context, "negative gradient" means that the longitudinal axis of the vehicle is inclined downward or the standing-start direction of the vehicle points in the downward direction. Let a negative sign of the angle of gradient indicate this direction.

A "positive gradient" means that the longitudinal axis of the vehicle is inclined upward or that the standing-start direction of the vehicle points in the upward direction. Let a positive sign of the angle of gradient indicate this direction.

Figure 4:
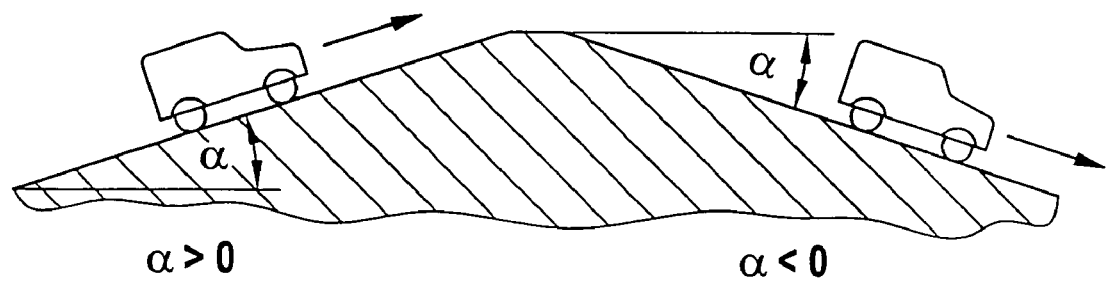
FIG. 4 shows illustratingly the signs of the angle of gradient in the case of a standing-start operation in the forward direction of the vehicle.

A positive angle of gradient is shown in FIG. 4 on the left side, and a negative angle of gradient is represented in FIG. 4 on the right side. FIG. 4 shows the respective standing-start direction indicated by the arrow, i.e. the vehicle drives off in the forward direction.

Figure 5:
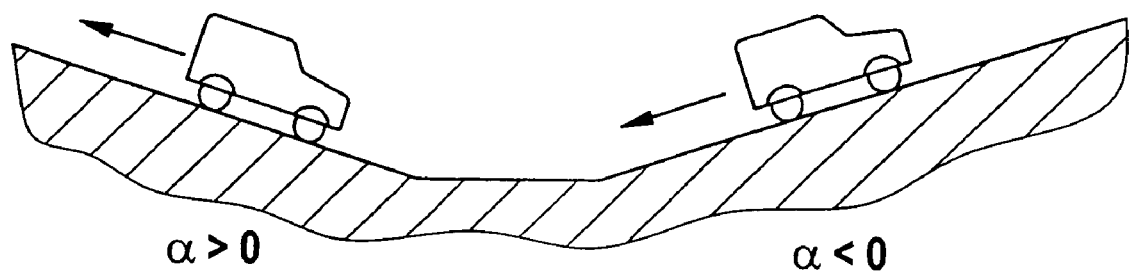
FIG. 5 shows illustratingly the signs of the angle of gradient in the case of a standing-start operation in the reverse direction of the vehicle.

An extension of the idea to the case where the vehicle drives off in the reverse direction is represented in FIG. 5. Here the arrow also points in the standing-start direction.

In summary, one speaks of a positive gradient if the standing-start direction of the vehicle points upward, and one speaks of a negative gradient if the standing-start direction of the vehicle points downward. Whether the vehicle drives off in the forward direction or in the reverse direction may be determined, for example, by the gear selected.

The three measures mentioned are discussed in what follows:

Measure 1: Shortened Holding Time for a Negative Gradient

The holding time is reduced in the case of a negative gradient (i.e. downhill), so that the hillholder holds the vehicle only for a short period. This is less disturbing for the driver than a longer holding time. This makes it easier for the driver to let the vehicle coast downhill.

Measure 2: Prolonged Holding Time for a Positive Gradient

The holding time is increased in the case of a positive gradient (i.e. uphill), so that the driver has more time to switch from the brake pedal to the accelerator pedal. Especially at steeper gradients it is particularly important that the vehicle not roll back. The prolonged holding time prevents rolling back or reduces the probability of rolling back.

Measure 3: Prolonged Extended Holding Time for a Positive Gradient

In addition to the holding time, the extended holding time is prolonged in the case of a steeper positive gradient (i.e. uphill).

This provides the driver with more time to generate the necessary engine torque. Since at positive gradients the release torque (i.e. the minimum engine torque that just sets the vehicle in uphill motion) is proportional to the gradient, this prolongation of the extended holding time is especially useful at positive gradients.

The gradient values at which the holding time or the extended holding time is altered can be freely chosen, with the option of also using different gradients for positive and negative values. In practice, values of −5% and +5% have proven successful.

The gradient values provided in percentage are defined as a quotient

Gradient in %=(difference in elevation achieved)/(difference in path projected onto the horizontal plane)*100%.

Figure 6:
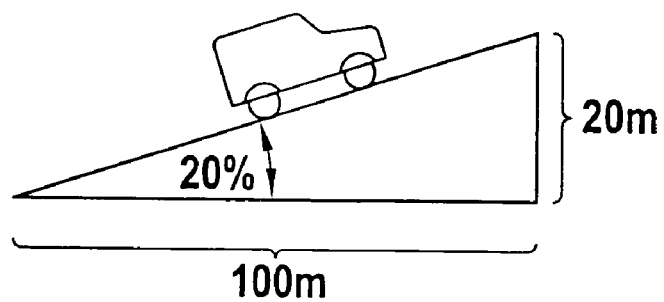
FIG. 6 shows the definition of the angle of gradient in %.

This is represented illustratingly in FIG. 6. There a value of 100 m for the horizontal projection of the path length results in a difference in elevation of 20 m. Consequently the gradient is 20%.

The mode of action of the present invention is represented in FIG. 1. Angle of gradient a in the longitudinal direction of the vehicle is shown in the abscissa direction in FIG. 1, while various times are plotted in the ordinate direction. The upper curves in the diagram of FIG. 1 refer to holding time T0, whereas the lower curves refer to extended holding time T1. Here it is essential for the present invention that holding times T0 and/or extended holding times T1 are functions of the angle of gradient a of the roadway.

As an example, three different dependencies 100, 101 and 102 of holding time T0 are plotted in FIG. 1 as functions of the angle of gradient. All three characteristics have in common that for $\alpha \leq -5\%$ the holding time assumes the value of 0.5 second and for $\alpha \leq 5\%$ the holding time assumes the value of 1.0 second.

In the intermediate range $-5\% \leq \alpha \leq 5\%$ characteristic 100 assumes the constant value of 0.8 second, characteristic 101 represents a linear function of the angle of gradient and characteristic 102 represents a nonlinear function of the angle of gradient (for instance, an arc tangent function).

The extended holding time may be treated quite analogously. To illustrate, three characteristics 110 (=step function), 111 (=linear function) and 112 (=nonlinear function) are represented in FIG. 1.

Figure 2:
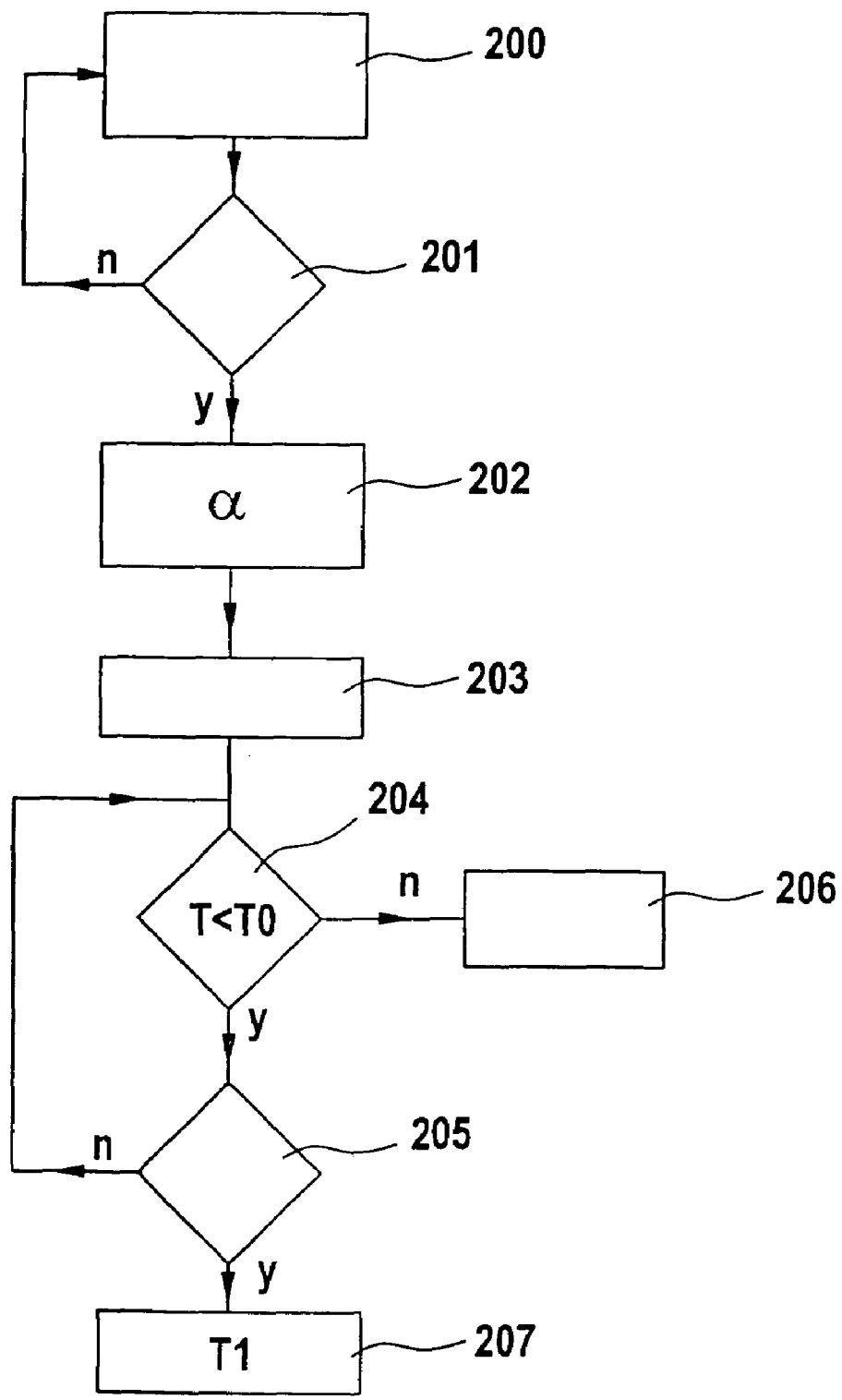
FIG. 2 shows the sequence of the method according to the present invention.

In all cases, of course, the time values entered in FIG. I represent only exemplary values. FIG. 2 shows the sequence of the method according to the present invention.

The method begins in block 200. In block 201, a determination is made whether the vehicle is engaged in a braked standstill. If the answer is "yes" (always indicated as "y" in FIG. 2), then angle of gradient a of the roadway is subsequently ascertained in block 202 (the gradient of the roadway may also be ascertained from the stopping process prior to standstill). If, on the other hand, the answer in block 201 is "no" (always indicated as "n" in FIG. 2), there is a return to block 200. After block 202, the hillholder is now activated in block 203 to prevent the vehicle from rolling away following stoppage. The hillholder maintains the driver-independent braking force at a maximum for a time span of length T0. To this end, a query is made in block 204 as to whether the lapsed activation time T of the hillholder has not yet exceeded maximum value T0, the query having the form "T<T0?". If the answer is "no" (i.e. the maximum value has been exceeded), the hillholder is deactivated in block 206. If, on the other hand, the answer is "yes", then a check is performed in block 205 to determine whether the driver is signaling an intention to drive off. If the answer in block 205 is "yes", then the holding time of the hillholder still to be applied is set to value T1 (i.e. the extended holding time) in block 207. If, on the other hand, the answer is "no", block 204 is repeated and a new check is run to determine whether the holding time T0 has already expired. In this process, time spans T0 and T1 are a function of the angle of gradient ascertained in block 202.

Figure 3:
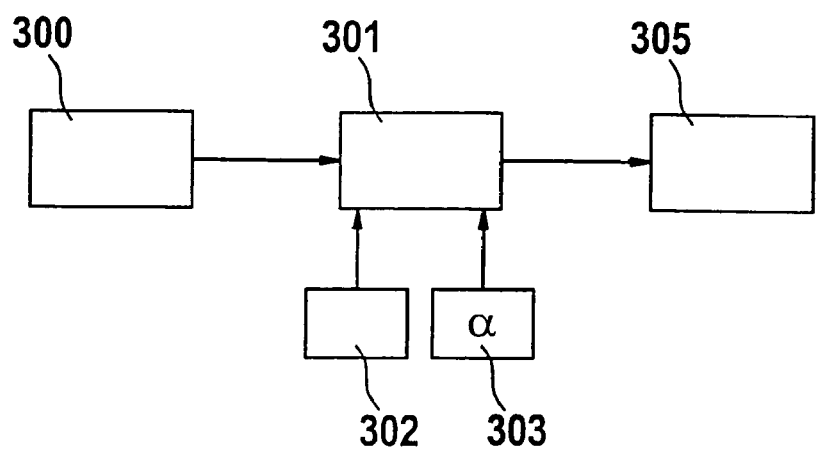
FIG. 3 shows the design of the device according to the present invention.

The configuration of a specific embodiment of the device according to the present invention is shown in FIG. 3. In this configuration, block 301 represents the hillholder, which triggers brake actuators 305. The hillholder receives its activation signals (e.g. vehicle standstill) from sensor means 300. The hillholder additionally receives signals representing the driver's intention to drive off from sensor means 302 as well as signals representing the angle of gradient of the roadway from sensor means 303.

What is claimed is:

1. A method for controlling a braking system of a motor vehicle, comprising:

in order to prevent the vehicle from rolling away following a braked standstill, setting a first braking-force value independently of a driver at at least one wheel of the vehicle and holding the first braking-force value for a specified limited first holding time;

ascertaining a gradient angle of a roadway in a longitudinal direction of the vehicle, wherein the first holding time is a function of the gradient angle;

monitoring an intention of the driver to drive off through an operation of an accelerator pedal; and if the intention of the driver to drive off is detected during the first holding time:

cutting short the first holding time, and from the point of cutting short the holding time, maintaining a second braking-force value independently of the driver for a specified extended second holding time.

2. The method as recited in claim 1, wherein the extended second holding time is a function of the gradient angle.

3. The method as recited in claim 2, wherein the extended second holding time is a function of the gradient angle in such a way that the extended second holding time assumes a maximum value when the gradient angle exceeds a specified positive limiting value.

4. The method as recited in claim 2, wherein the extended second holding time is a continuous function of the gradient angle.

5. The method as recited in claim 2, wherein:

if the gradient angle has a negative sign in the case of a downhill standing-start operation and a positive sign if the gradient angle has a positive sign in the case of an uphill standing-start operation, the extended second holding time one of remains constant and increases with an increase of the gradient angle.

6. The method as recited in claim 1, wherein the first holding time is a continuous function of the gradient angle.

7. The method as recited in claim 1, wherein:

if the gradient angle has a negative sign in the case of a downhill standing-start operation and a positive sign if the gradient angle has a positive sign in the case of an uphill standing-start operation, the first holding time one of remains constant and increases with an increase of the gradient angle.

8. The method as recited in claim 1, wherein the first braking-force value is equal to the second braking-force value.

9. A device for controlling a braking system of a motor vehicle, comprising:

a roll-away prevention arrangement for, in order to prevent the vehicle from rolling away following a braked standstill, setting a first braking-force value independently of a driver at at least one wheel of the vehicle and holding the first braking-force value for a specified limited first holding time;

an arrangement for ascertaining a gradient angle of a roadway in a longitudinal direction of the vehicle, wherein the first holding time is a function of the gradient angle;

monitoring an intention of the driver to drive off through an operation of an accelerator pedal; and if the intention of the driver to drive off is detected during the first holding time:

cutting short the first holding time, and from the point of cutting short the holding time, maintaining a second braking-force value independently of the driver for a specified extended second holding time.

* * * * *